(12) United States Patent
Hahn et al.

(10) Patent No.: US 7,863,574 B2
(45) Date of Patent: Jan. 4, 2011

(54) MULTIMODALITY IMAGING SYSTEM (75) Inventors: Guenter Hahn, Barrington, IL (US);
Alexander Hans Vija, Evanston, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 33 days.

(21) Appl. No.: 12/503,963

(22) Filed: Jul. 16, 2009

(65) Prior Publication Data

US 2010/0102239 A1  Apr. 29, 2010

Related U.S. Application Data (60) Provisional application No. 61/081,121, filed on Jul. 16, 2008.

(51) Int. Cl.
*G01T 1/166* (2006.01)
(52) U.S. Cl. .................................. 250/363.05
(58) Field of Classification Search . 250/363.01–363.1, 250/370.01–370.15; 378/98.8
See application file for complete search history.

(56) References Cited

U.S. PATENT DOCUMENTS

| | | | |
|---|---|---|---|
| 5,155,365 A | 10/1992 | Cann et al. | |
| 6,399,951 B1 | 6/2002 | Paulis et al. | |
| 6,628,743 B1 * | 9/2003 | Drummond et al. | 378/8 |
| 6,670,614 B1 * | 12/2003 | Plut et al. | 250/363.04 |
| 6,956,925 B1 | 10/2005 | Hoffman | |
| 2006/0237652 A1 * | 10/2006 | Kimchy et al. | 250/363.02 |
| 2007/0050908 A1 * | 3/2007 | Kogan et al. | 5/128 |
| 2008/0103391 A1 * | 5/2008 | Dos Santos Varela | 600/436 |
| 2009/0264753 A1 * | 10/2009 | von Schulthess et al. | 600/431 |

OTHER PUBLICATIONS

Beyer et al., "A combined PET/CT Scanner for clinical oncology," 2000, The Journal of Nuclear Medicine, vol. 41, No. 8, pp. 1369-1379.*
Shieh, et al., "Iterative image reconstruction using prior knowledge," J Opt Soc Am A Opt Image Sci Vis, vol. 23, No. 6, pp. 1292-1300, Jun. 2006.
Adluru, et al., "Temporally constrained reconstruction of dynamic cardiac perfusion MRI", Magn. Reson. Med., vol. 57, No. 6, pp. 1027-1036, (Jun. 2007).
Hudson, et al., "Accelerated image reconstruction using ordered subsets of projection data", IEEE Trans. Med. Imaging, vol. 13, No. 4, pp. 601-609 (1994).

(Continued)

*Primary Examiner*—David P Porta
*Assistant Examiner*—Kiho Kim
(74) *Attorney, Agent, or Firm*—Peter L. Kendall (57) ABSTRACT

A system and method is provided for performing multimodal imaging of an object. The system and method includes performing spatio-temporal detection of transmission CT data of a fan X-ray beam, performing, and simultaneously with the spatio-temporal detection of transmission CT data, spatio-temporal detection of emission nuclear imaging data emitted from the object with a propagation direction across the propagation direction of the fan X-ray beam. The system and method further includes identifying at least two zones in the object based on the transmission CT data, reconstructing an image object from the emission nuclear imaging data under the constraint that respective portions of detected nuclear events are associated with selected zones, and outputting data representative of the image object.

20 Claims, 9 Drawing Sheets

OTHER PUBLICATIONS

Sureau, et al. "Impact of Image-Space Resolution Modeling for Studies with the High-Resolution Research Tornograph," J Nucl Med, vol. 49, No. 6, pp. 1000-1008, Jun. 1, 2008.

Alenius, et al.., "Generalization of median root prior reconstruction," IEEE Trans. Med. Imaging, vol. 21, No. 11, pp. 1413-1420, Nov. 2002.

Hsu, C.., "A prior image model with mixed continuity constraints for Bayesian PET image reconstruction," Nuclear Science Symposium, 1999, Conference Record, 1999 IEEE, vol. 3, pp. 1428-1432, Seattle, Washington, Oct. 1999.

Gindi, G., et al., "Bayesian reconstruction of functional images using anatomical information as priors", IEEE Trans. Med. Imaging, vol. 12, No. 4, pp. 670-680, 1993.

Zhenyu, et al., "Approximate maximum likelihood hyper-parameter estimation for Gibbs priors." Image Processing, IEEE Transactions on, vol. 6, No. 6, pp. 844-861, 1997.

Reutter, et al., "Direct least-squares estimation of spatiotemporal distributions from dynamic SPECT projections using a spatial segmentation and temporal B-splines," Medical Imaging, IEEE Transactions on, vol. 19, No. 5, pp. 434-450, 2000.

Parra, et al., "List-mode likelihood: EM algorithm and image quality estimation demonstrated on 2-D PET," Medical Imaging, IEEE Transactions on, vol. 17, No. 2, pp. 228-235, 1998.

Nuyts, et al. "Simultaneous maximum a posteriori reconstruction of attenuation and activity distributions from emission sinograms," Medical Imaging, IEEE Transactions on 5 vol. 18, No. 5. pp. 393-403, 1999.

Hero, et al., "Information analysis of single photon emission computed tomography with count losses", Medical Imaging 9, IEEE Transactions, pp. 117-127 (1990).

Kadrmas, et al., "Maximum a posteriori algorithm for the reconstruction of dynamic SPECT data", IEEE Nuclear Science Symposium and Medical Imaging Conference, vol. 3, pp. 2086-2089, Nov. 8-14, 1998.

Kawata, et al., "Constrained Iterative Reconstruction by the Conjugate Gradient Method" IEEE Trans. Med. Imaging, vol. 4, No. 2, pp. 65-71, 1985.

LaRiviere, et al., "Nonparametric regression sonogram smoothing using a roughness-penalized Poisson likelihood objective function", IEEE Trans. Med. Imaging, vol. 19, No. 8, pp. 773-786, 2000.

Chiao, et al., "Model-based estimation for dynamic cardiac studies using ECT", IEEE Trans. Med. Imaging, vol. 13, No. 2, pp. 217-226, 1994.

Nichols, et al, "Spatiotemporal reconstruction of list-mode PET data," Medical Imaging, IEEE Transactions on, vol. 21, No. 4, pp. 396-404, 2002.

Kadrmas, et al., "4D maximum a posteriori reconstruction in dynamic SPECT using a compartmental model-based prior," Physics in Medicine and Biology, vol. 46, No. 5, pp. 1553-1574, 2001.

D. J. Kadrmas, "Statistically regulated and adaptive EM reconstruction for emission computed tomography," Nuclear Science, IEEE Transactions on, vol. 48, No. 3, pp. 790-798, 2001.

Shao, L., et al., "Information gain from count correction in SPECT image reconstruction and classification", IEEE Trans. Nucl. Science, vol. 37, No. 2, pp. 652-657, 1990.

Shieh, et al., "Image reconstruction: a unifying model for resolution enhancement and data extrapolation. Tutorial," J Opt Soc Am A Opt Image Sci Vis, vol. 23, No. 2, pp. 258-266, Feb. 2006.

Wernick, et al., "Emission tomography: the fundamentals of PET and SPECT", Chapters 7,11 and 21, Elsevier, Academic Press, 2004.

Galatsanos, et al., "Methods for Choosing the Regularization Parameter and Estimating the Noise Variance in Image Restoration and Their Relation", IEEE Transactions on Image Processing, vol. 1, No. 3, pp. 322-336 (Jul. 1992).

Fessler, et al., "Space-alternating generalized expectation- maximization algorithm", Signal Processing, IEEE T-SP 42 (10): 2664-77, (Oct. 1994).

Puetter, et al., "Digital Image reconstruction: deblurring and denoising", Annu. Rev. Astro. Astrophys., 2005, 43:139-194.

Puetter, et al., "The pixon method of image reconstruction", Astronomical Data Analysis Software and Systems VIII, Astronomical Society of the Pacific, Conference Series 1999, 172, 307-316.

Lehovich, et al., "Human observer LROC study of lesion detection in Ga-67 SPECT images reconstructed using MAP with anatomical priors", 2006 IEEE nucl., Sci. Symp. Conf. Rec., 1699-702.

Lehovich, et al., "Choosing anatomical-prior strength for MAP SPECT reconstruction to maximize lesion detectability", 2007 IEEE Nucl. Sci. Symp. Conf. Rec., 4222-5.

K.J. Mighell, "Parameter estimation in astronomy with Poisson-distributed data. II. The modified chi-square gamma statistic", 2000, arXiv:astro-ph/0007328.

J. Hadamard, "Sur les problèmes aux dérivées partielles et leur signification physique", Princeton Uni. Bull., 13, 49-52, (1902).

Tsui, B.M.W., et al., "Quantitative cardiac SPECT reconstruction with reduced image degradation due to patient anatomy", IEEE Trans. Nuc. Sci., 41, 2838-44, 1994.

Gorman, J.D. and Hero, A.O., "Lower bounds for parametric estimation with constraints", IEEE Trans. Information Theory, vol. 36, No. 6, pp. 1285-1301, 1990.

Siemens Medical, "Symbia SPECT Working For You", Product Information, 2007.

Haacke, et al., "Constrained reconstruction: A super-resolution, optimal signal-to-noise alternative to the Fourier transform in magnetic resonance imaging", Medical Physics, vol. 16, No. 3, pp. 388-397, 1989.

Halder, et al., "Anatomically constrained reconstruction from noisy data", Magn. Reson. Med., vol. 59, No. 4, pp. 810-818, Apr. 2008.

Rangarajan, et al., "A model-based approach for filtering and edge detection in noisy images", IEEE Trans. Circuits and Systems, vol. 37, No. 1, pp. 140-144, 1990.

Roggemann, et al., "Model-based image reconstruction by means of a constrained least-squares solution", Appl Opt, vol. 36, No. 11, pp. 2360-2369, Apr. 10, 1997.

Roy, et al., "Three-dimensional unconstrained and constrained image-reconstruction techniques applied to fluorescence, frequency-domain photon migration", Appl. Opt., vol. 40, No. 13, pp. 2206-2215, May 1, 2001.

Tapiovaara, M.J. and Wagner, R.F., "SNR and noise measurments medical imaging: I. A practical approach based on statistical decision theory", Phys. Med. Biol., vol. 38, pp. 71-92, 1993.

Hadamard, J.,"Lectures on Cauchy's Problem in Linear Partial Differential Equations", New Haven: Yale Press. Reprinted 1952. New York: Dover Publications. (Webpage print out of coverpage, synopsis and table of contents from www.bn.com).

Green, P.J. and Silverman, B.W., "Generalized Linear Models: A Roughness Penalty Approach", Chapman & Hall/ CRC, 1994 (Webpage print out of coverpage, synopsis and table of contents from www.bn.com).

Turkheimer, et al., "PET image denoising using a synergistic multi-resolution analysis of structural (MRI/CT) and functional datasets", J. Nucl. Med., 2008, 49:657-666.

Somayajula, et al. "PET image reconstruction using anatomical information through mutual information based priors." 2005 IEEE Nuclear Science Symposium Conference Record, 2005, pp. 2722-2726.

Mighell, K.J., "Parameter Estimation in Astronomy with Poisson-distributed Data. I. The $XY_2$ Statistic", Astrophys. J. 518, 380-393, Jun. 10, 1999.

Wesolowski., et al., "Improved lesion detection from spatially adaptive, minimally complex Pixon® reconstruction of planar scintigraphic images", Computerized. Medical Imaging Graphics 29 (2005) pp. 65-81.

* cited by examiner

MULTIMODALITY IMAGING SYSTEM

CROSS-REFERENCE TO RELATED APPLICATION

This application claims the benefit of priority under 35 U.S.C. §119(e) of U.S. Provisional Patent Application Ser. No. 61/081,121 by H. Vija et al. entitled "MULTIMODAL IMAGE RECONSTRUCTION" and filed on Jul. 16, 2008.

TECHNICAL FIELD

This invention relates to medical imaging, and in particular, to nuclear and computer tomographic imaging.

BACKGROUND

Medical imaging of metabolic and biochemical activity within a patient is known as functional imaging. Functional imaging techniques include, for example, nuclear imaging such as Positron Emission Tomography (PET), Single Photon Computed Tomography (SPECT), functional magnetic resonance imaging (fMRI), and functional computed tomography (fCT). The reconstruction of a functional image from data acquired by functional imaging is often difficult because the data is often characterized by a low signal rate and low signal-to-noise ratio. For nuclear imaging, for example, the count rate is limited by the amount of a radioactive substance that can be administered without harming the patient.

In addition, a functional image does not necessarily provide structural information. Thus, one evaluates a functional image often with the help of a structural image.

An overview of SPECT systems, PET systems, and their combination with computer tomography (CT) systems as well as iterative image reconstruction for emission tomography is given in chapter 7, chapter 11, and chapter 21 of M. Wernick and J. Aarsvold, "Emission tomography: the fundamentals of PET and SPECT," Elsevier Academic Press, 2004, the contents of which are herein incorporated by reference.

SUMMARY

The invention is based in part on the recognition that multimodal imaging, as described in U.S. patent application Ser. No. 12/369,159, by H. Vija et al. entitled "MULTIMODAL IMAGE RECONSTRUCTION" and filed Feb. 11, 2009, the contents of which are incorporated herein by reference, allows one to compensate for very low counts in nuclear imaging by considering anatomical imaging data that is spatially registered with the nuclear imaging data. As one needs to acquire sufficient counts, the time scales to acquire a useful emission image (e.g., SPECT image) is much larger than to acquire a CT image based on Bremsstrahlung, e.g., using an x-ray generating vacuum tube. Commercial multi-modality devices have been built, but they typically cannot acquire a distribution within a common field-of-view (FOV) and at or close to the same time. Typically the FOV are spatially separated, and the scans occur successively.

The inventors realized that multimodal image reconstruction can be based on simultaneously measured nuclear (e.g., SPECT) data and anatomical imaging (e.g., CT) data within a common field-of-view (FOV). With multimodal imaging, a nuclear scan can be done in the same time scale as the anatomical scan. While the anatomical imaging data acquisition can be controlled in time, e.g., the x-ray source can be switched on and of, nuclear events are not controlled. Therefore, simultaneously measuring as described herein includes quasi-simultaneously measuring the data such that the gained information essentially relates to a common state of the subject. For such a spatio-temporal consistent acquisition of the nuclear and anatomical imaging data, multimodal imaging systems combine components needed for nuclear imaging and components for a diagnostic quality CT scan mounted onto the same gantry ring.

In some embodiments, the gantry ring is configured, for example, for a rotation with a duration of about 1 s per revolution or faster, thereby allowing one to obtain a diagnostic quality CT scan. In fact, only if the rotation time is below 1 s one can expect artifacts due to, for example, breathing motion to disappear. In general the faster the rotation time the better the tomographic snapshot of the organ, and most high-end CT systems have rotations time of 0.5 s or faster. Moreover, with a revolution duration of 1 s and less, the activity distribution of a radioactive substance administered to a patient for the nuclear imaging process remains essentially the same between two rotations, and thus quasi-stationary. Moreover, because the anatomy is simultaneously measured, nuclear imaging data and anatomic CT data are spatio-temporal consistent.

In contrast, slowly-rotating nuclear imaging systems can acquire inconsistent data because the acquisition time is much longer than the time scale of processes such as patient movement, organ motion, breathing, and the pharmaco-kinetics of the administered radioactive substance. As a result, projection views can not only be different from each other because the viewing angles have changed, but also because the activity distribution itself may have changed during the lapse of time between two successive views.

In one aspect, the invention features multimodality imaging systems that include a gantry with a stationary unit and a rotating unit rotatable around a rotation axis and providing an opening extending along the rotation axis through which a subject is insertable, a support table coupled to the stationary unit for supporting a subject, a table drive unit coupled to the support table for translating the support table in a direction extending along the rotation axis, and a CT source coupled to the rotating unit, the CT source being configured to emit a fan beam through the opening, a CT detector coupled to the rotating unit opposite the CT source, the CT source being configured to detect the fan beam, a nuclear imaging detector coupled to the rotating unit, the nuclear imaging detector being configured to detect nuclear radiation emitted from within the opening in a direction differing from a propagation direction of the fan beam. The multimodality imaging systems include further a control unit configured to, during operation of the multimodality imaging system, cause the rotating unit to rotate with a revolution time of one second or less, and to control the translation of the support table such that the CT detector performs diagnostic quality CT imaging of the subject and the nuclear imaging detector performs a spiral scan of the subject, whereby the multimodality imaging system acquires spatio-temporally consistent transmission CT data and emission nuclear imaging data.

Implementations of the multimodality imaging systems may include one or more of the following features or features of other aspects.

The control unit can be configured to control the CT detector and the nuclear imaging detector to acquire simultaneously the transmission CT data and the emission nuclear data, respectively.

In some embodiments, a nuclear field-of-view defined by the nuclear imaging detector and a CT field-of-view defined by the CT detector can overlap.

In some embodiments, a common slip ring can be coupled to the rotating unit and the nuclear imaging detector, the CT detector, and the CT source can be mounted to the common slip ring.

The nuclear imaging detector can include two detector units arranged at opposite sides of the fan beam. The nuclear imaging detector can include at least one single photon computed tomography detector unit. The nuclear imaging detector can include at least one positron emission tomography detector unit. The nuclear imaging detector can include at least one combined single photon computed tomography and positron emission tomography detector unit. The nuclear imaging detector can include a ring detector system. In some embodiments, a radiation sensitive surface of the nuclear imaging detector can be arranged at a radial distance from the rotation axis that is the same or less than the radial distance from the rotation axis to a radiation sensitive surface of the CT detector.

In some embodiments, the nuclear imaging detector can include a collimator with a rigidity sufficient to withstand force generated by a rotation of the nuclear imaging detector with a revolution time of one second or less than 1 second. For example, the nuclear imaging detector can include a tungsten collimator. The nuclear imaging detector can include a collimator configured for at least one of active collimation, passive collimation, parallel collimation, focusing collimation, multi-focusing collimation, and coded-aperture collimation.

In some embodiments, the CT source can be configured for pulsed CT emission.

In some embodiments, the systems can further include an image processing unit configured for multimodal reconstruction for reconstructing the emission nuclear imaging data based on zonal information derived from the transmission CT data. Zonal information can define a separation of the nuclear field-of-view into at least two zones and is derived from the transmission CT data.

In another aspect, the invention features methods of multimodal imaging of an object that include performing spatio-temporal detection of transmission CT data of a fan X-ray beam, performing, simultaneously with the spatio-temporal detection of transmission CT data, spatio-temporal detection of emission nuclear imaging data emitted from the object with a propagation direction across the propagation direction of the fan X-ray beam, identifying at least two zones in the object based on the transmission CT data, reconstructing an image object from the emission nuclear imaging data under the constraint that respective portions of detected nuclear events are associated with selected zones, and outputting data representative of the image object.

Implementations of the multimodality imaging systems may include one or more features of other aspects.

In another aspect, the invention features multimodality imaging systems that include a gantry with a stationary unit and a rotating unit rotatable around a rotation axis, the gantry having a wall forming an opening extending along the rotation axis, wherein a CT source coupled to the rotating unit, the CT source being configured to emit a fan beam through the opening, a CT detector coupled to the rotating unit, the CT detector being mounted opposite the CT source and configured to detect the fan beam, the CT source and the CT detector defining a CT field-of-view, and a nuclear imaging detector coupled to the rotating unit, the nuclear imaging detector being configured to detect nuclear radiation emitted from within the opening in a direction differing from a propagation direction of the fan beam, the nuclear imaging detector defining a nuclear field-of-view, wherein at least one of the CT field-of-view and nuclear field-of-view are tilted with respect to a plane orthogonal to the axis of rotation.

Implementations of the multimodality imaging systems may include one or more of the following features of this or other aspects.

In some embodiments, the CT field-of-view can extend between the CT source and the CT detector and is shaped as a slice having a thickness defined by a thickness of the CT detector. The nuclear field-of-view can extend from the nuclear imaging detector along a direction defined by a collimator of the nuclear imaging detector.

The rotating unit can include a common slip ring, and wherein the nuclear imaging detector, the CT detector, and the CT source are mounted to the common slip ring.

In some embodiments, the acquisition of the data for anatomical and nuclear imaging occurs simultaneously with the CT detector and the nuclear imaging detector. Thus, the imaging without time delays can provide temporally synchronized clinical information. The overlapping FOV can essentially avoid or at least reduce errors in the registration of the anatomical and nuclear imaging data.

The details of one or more embodiments are set forth in the accompanying drawings and the description below. Other features and advantages will be apparent from the description and drawings, and from the claims.

BRIEF DESCRIPTION OF DRAWINGS

Like reference symbols in the various drawings indicate like elements.

DETAILED DESCRIPTION

As described in the above mentioned U.S. patent application Ser. No. 12/369,159, by H. Vija et al. entitled "MULTI-MODAL IMAGE RECONSTRUCTION" and filed Feb. 11, 2009, reconstructing an image object based on functional image data and anatomical information can generate a functional image of an examined object by considering spatiotemporal anatomical structure (derived from the anatomical information) of the object. This kind of reconstruction, herein referred to as multimodal image reconstruction, relies on separating the object into multiple zones. All points in a given zone are treated equally in reconstructing the functional image data. However, points in different zones need not be treated equally. One aspect of treating the different zones differently is that one can allocate different amounts of nuclear signal (e.g., detected nuclear events) to the zones according to the zone's contribution to the nuclear signal observed. These contributions of the zones to the reconstructed image object can be optimized during the reconstruction and/or pre-assigned based on the anatomical information.

Using information about the spatio-temporal anatomical structure of the examined object requires that the functional image data and the anatomical information be registered in time and space relative to each other so that in fact the anatomical information is applied to the correct corresponding functional image data.

For example, high resolution imaging techniques such as CT imaging can provide precise anatomical information about the examined object. Such information allows a system to assign detected tissue to a corresponding zone. Anatomical information can include, for example, information about the imaged tissue (e.g., geometry and type), the movement of the tissue (e.g., breathing, cardiac movement), and the temporal behavior of the contrast agent/radioactive substance (e.g., flow, absorption, half-life).

In the following, systems are described that provide for simultaneously (or quasi-simultaneously) acquiring CT and nuclear imaging data that relate essentially to the same spatio-temporal imaged volume.

Figure 1A:
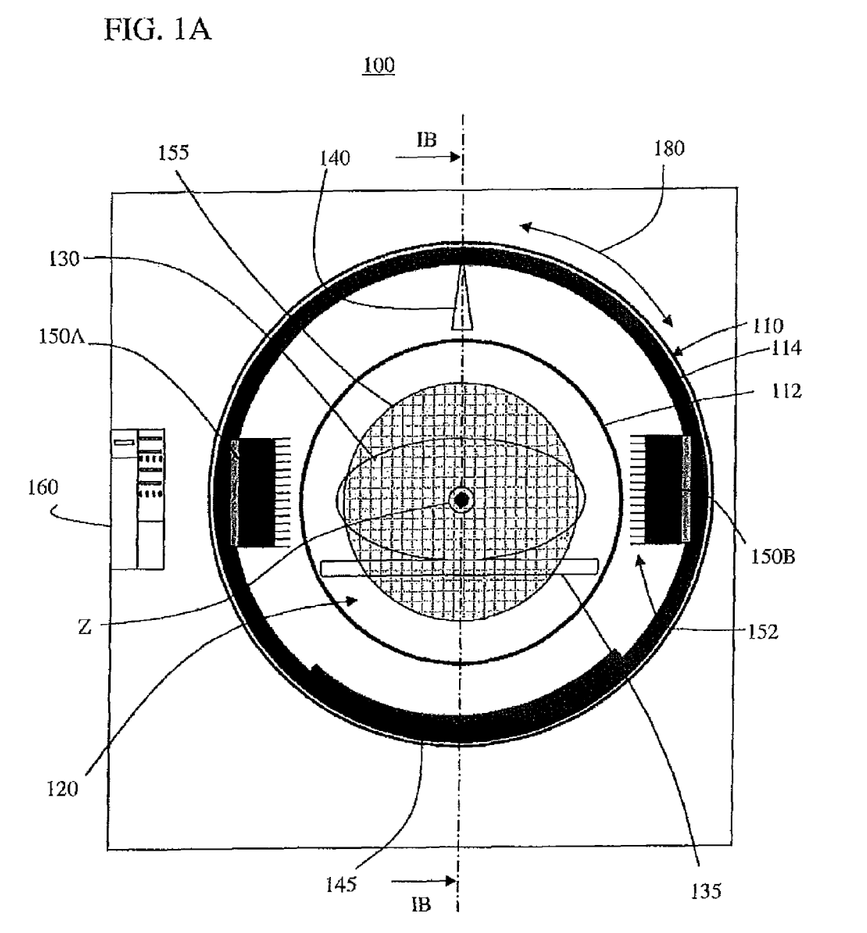
FIG. 1A is a view of an embodiment of a multimodal imaging system along a rotation axis.
Figure 1B:
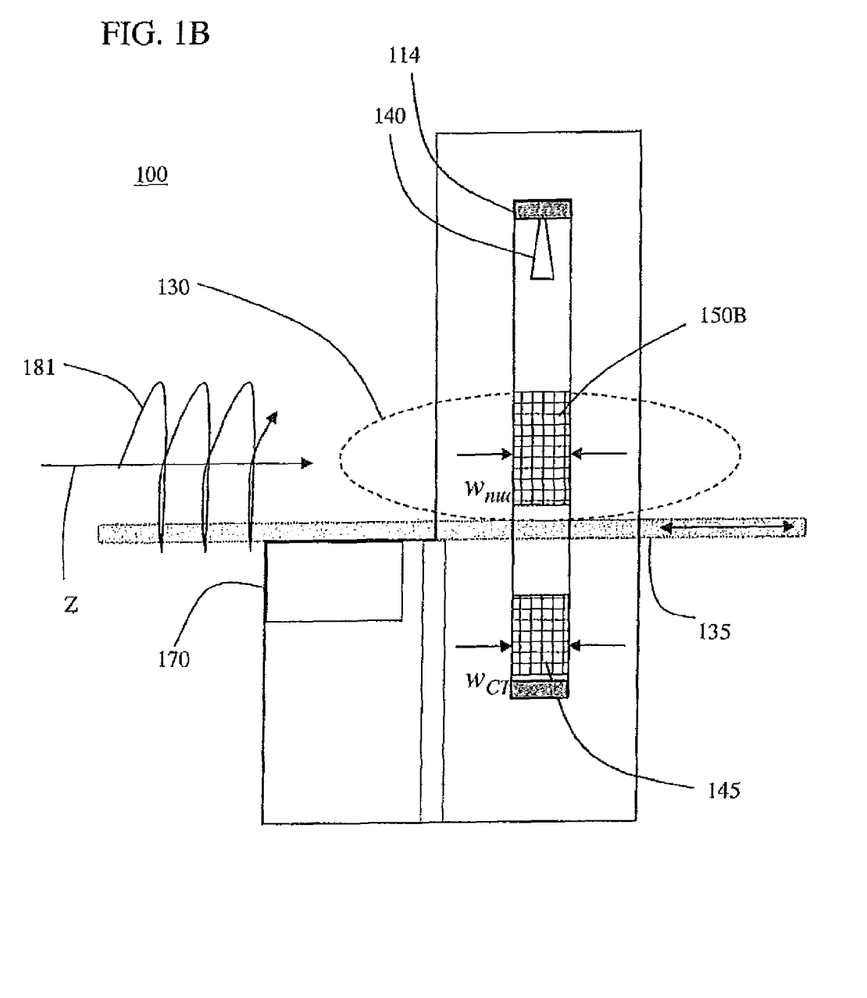
FIG. 1B is a vertical cut view of the multimodal imaging system of FIG. 1A.

FIGS. 1A and 1B show a multimodal imaging system 100 with a stationary unit and a rotating gantry ring 110 that provides an opening 120 for receiving a patient 130 positioned on a support table 135 with a cylindrical chamber. To avoid cluttering the figures, the patient and the support table are often indicated in the following figures without explicit reference numerals. Gantry ring 110 carries gantry elements, such as a CT source 140 and a multimodal detector system, which are mounted to a common slip ring 114. A cover 112 of gantry ring 110 separates gantry elements from opening 120. CT source 140 is, for example, a source of an X-ray fan beam that is emitted towards patient 130 along a propagation direction of the fan beam.

The multimodal detector system includes components of a CT imaging system to provide anatomical information about a patient 130 and components of a nuclear imaging system for determining the distribution of radioactive material within the patient. Examples of the components of the CT system include a CT detector 145 configured to detect radiation emitted from CT source 140 and transmitted through the patient 130, a CT data read-out system (not shown), a high-voltage power source (not shown), a canbus system (not shown), and a cooling system (not shown). Examples of the components of the nuclear imaging system include a nuclear detector subsystem, e.g., a pair of opposing nuclear imaging detectors 150A, 150B for SPECT and/or PET imaging, and a nuclear imaging data read-out system (not shown).

Based on the size of CT detector 145 and nuclear imaging detectors 150A, 150B, multimodal imaging system 100 provides three-dimensional (3D) FOVs for the CT and nuclear imaging systems. For a rotating multimodal detector system, the shape of the FOVs is essentially a circular slice. The diameter of the CT FOV depends, for example, on the distance between CT source 140 and CT detector 145. The diameter of the nuclear FOV depends, for example, on the distance between SPECT detectors 150A, 150B.

As shown in FIG. 1B, an axial thickness of the CT FOV depends on the axial extension $w_{CT}$ of CT detector 145. Similarly, an axial thickness of the nuclear FOV depends on the axial extension $w_{nuc}$ of nuclear imaging detectors 150A, 150B. For example, the width can be about at least 10-15 (e.g. 12) cm to cover the heart. In general, the width can depend on the specific application. The number of pixels depends on chosen pixel size and can be determined by taking the extent of the FOV and dividing by the chosen matrix size, typically 128, 256 for nuclear imaging, and 512 for CT. However, in general other types of matrix size work as well.

In some embodiments, the pixel size for nuclear imaging is an integer value of the pixel size of the CT pixel size. For example, powers of 2 based matrix size match usually well.

The CT FOV and nuclear FOV overlap at least partly within an examined patient, thereby providing a common FOV 155 (see FIG. 1A) in the region of overlap. The shape of the nuclear FOV is further determined by collimators 152, shown in FIG. 1A, that can provide a focused nuclear FOV. A registration of the CT FOV and nuclear FOV is given by the relative arrangement of the CT detector 145 and the nuclear imaging detectors 150A, 150B. Thus, one can use, for example, a pre-registration of the CT imaging process and the nuclear imaging process performed with multimodal imaging system 100 to register of the CT FOV and nuclear FOV.

The stationary unit of multimodal imaging system 100 includes a support table drive unit 170 and a controller 160 that controls support table drive unit 170 (see FIG. 1A), gantry ring 110 (e.g., gantry rotation speed), CT source 140, CT detector 145, and nuclear imaging detectors 150A, 150B.

Controller 160 can additionally include a processor and memory having code thereon for multimodal image reconstruction. The reconstruction techniques included in the code take advantage of the multimodal reconstruction as described in the above mentioned U.S. patent application Ser. No. 12/369,159, by H. Vija et al. entitled "MULTIMODAL IMAGE RECONSTRUCTION" and filed Feb. 11, 2009, which discloses reconstructing nuclear imaging data in conjunction with and assisted by, e.g., CT imaging data.

For a multimodal imaging process, patient 130, who has been administered a radioactive substance, is positioned on support table 135. A user selects a multimodal imaging protocol defining the anatomical and nuclear imaging parameters of the intended multimodal imaging process. The user then selects a start position and an end position, and moves support table 135, via controller 160, to the start position. FIG. 1B shows the center of the body of patient 130 at the start position. Typically, one covers the volume of interest, e.g., for a heart scan the heart, a lung scans, the lungs etc. In some embodiments, one performs a topogram or scout, planar CT view, or a planar nuclear view before the main scan to determine the ranges, i.e., the start and end positions.

For the data acquisition with multimodal imaging system 100, controller 160 moves support table 135 along a rotation axis Z through opening 120 and simultaneously rotates gantry ring 110 with a revolution frequency of about 1 Hz or more as needed for CT imaging. The rotation around rotation axis Z is indicated in FIG. 1A with a double-headed arrow 180. The combination of rotation and translation enables multimodal imaging system 100 to perform concurrently or (CT in strobed mode) helical SPECT and high resolution CT scans. As a result, the CT imaging system and the nuclear imaging system simultaneously (or quasi-simultaneously) acquire CT imaging data from transmitted X-ray radiation and nuclear imaging data from emission events for their respective FOVs and accordingly, also for common FOV 155.

The movement of support table 135 can be step wise and/or continuously. Arrow 181 in an asymmetric spiral form indicates, for example, a stepwise movement that is stationary for about ¾ of a rotation. The stationary portions can extend from even smaller fractions of a rotation to several rotations. Tomographic imaging can also be supported by smaller fractions, e.g., ½, ¼ or less, due to the extension of the detectors. A symmetric spiral would correspond to a continuous movement.

The table speed and the width of the detectors define the so called pitch. A pitch of 1 corresponds to a table movement of 1 cm/s for a detector of a width of 1 cm. For a pitch of 1, the detector surface covers during the measurement the complete cylinder surface. A pitch smaller than 1 yields overlapping detector positions during the measurement and a pitch larger than 1 does not cover every region of the cylinder surface. Moreover, one has to distinguish between single line and multi line detectors, for example, by introducing an effective pitch.

Finally, the pitch for the CT and nuclear measurement in general can differ from each other because the width of the detectors is usually different. In addition, the size of the detector elements and the number of detector elements may vary. Even though in the figures axial extension $w_{CT}$ of CT detector 145 and axial extension $w_{nuc}$ of nuclear imaging detectors 150A, 150B are shown to be similar for illustration purposes, their extensions will in general be adapted to each imaging type.

For a spiral CT acquisition (including spiral CT), a detector with for example 1-6 lines having a width of up to about 3 cm can be used. With table feed speeds of below and up to 10 cm/s, usually a CT pitch is in the range from 0.5 to 2, e.g., 1 or 1.8.

For SPECT (including spiral SPECT), a common detector width is 15 cm to cover the heart. At the same table feed speed, the SPECT pitch is then 20% of the pitch of a 3 cm CT detector. E.g., SPECT pitches can be in the range of 0.1 to 0.5.

Thus, depending of the intended applications, one can select the extension $w_{CT}$ of CT detector 145 and the axial extension $w_{nuc}$ of nuclear imaging detectors 150A, 150B to allow acceptable pitches for each of the imaging modes.

In general, the data acquisition provides for a common FOV and therefore, different information content from the same spatial region. Thus, the FOVs are registered essentially in time and space, e.g., as close as possible to a perfect temporal registration. In some embodiments, the CT and nuclear FOVs can be identical. However, identical FOVs are not required, but the coverage of data to reconstruct the VOI is essentially identical to allow the benefits of multimodal reconstruction.

Each of the nuclear imaging detectors 150A, 150B shown in FIGS. 1A and 1B can be a solid state detector that includes a direct converter and a collimator 152. Collimator 152 can be made of tungsten to provide the required rigidity. However, in general, various types of detectors can be used as long as they withstand the mechanical load caused by rotation. Collimation schemes can be active or passive, parallel, focusing, multi-focusing, or be based on coded-aperture designs. Examples for detectors and collimators are described, for example, in "Extracting Location Information Using Difference Images From a Non-Parallel Hole Collimator" a provisional application filed at the USPTO and having Ser. No. 61/097,925, filed on Sep. 18, 2008, the contents of which are hereby incorporated by reference.

Figure 2:
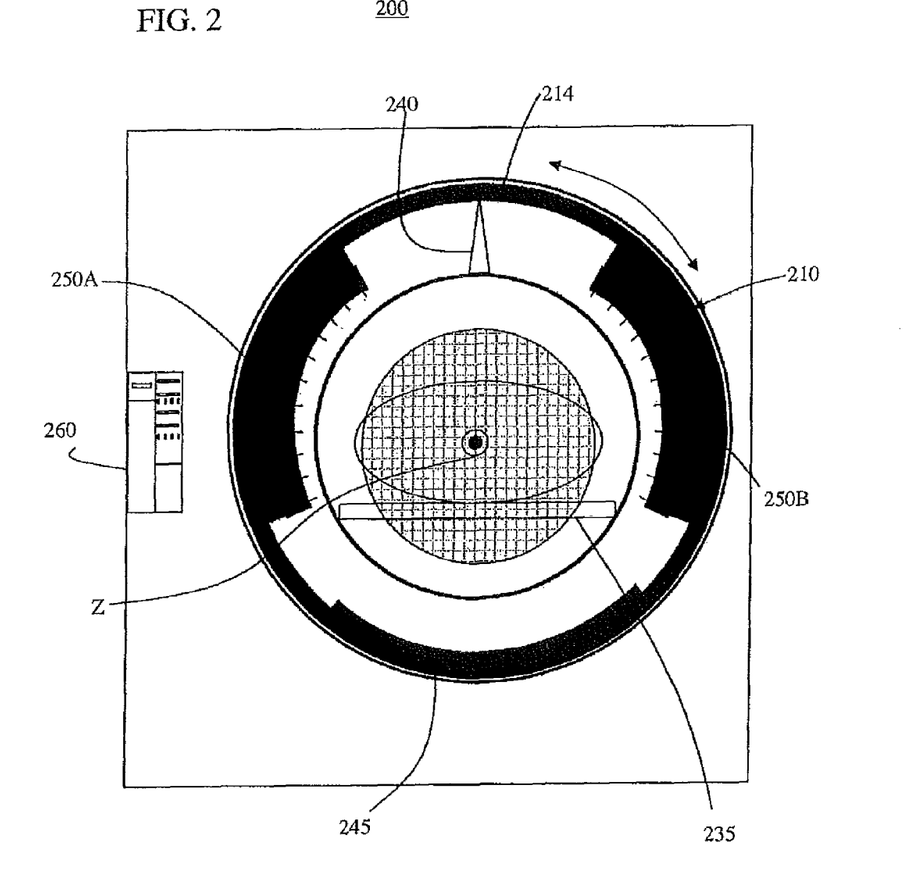
FIG. 2 is a view of an embodiment of a multimodal imaging system along a rotation axis.

While nuclear imaging detectors 150A, 150B are indicated as planar detectors in the embodiment of FIGS. 1A and 1B, other types of nuclear imaging detectors are also possible. For example, FIG. 2 shows a multimodal imaging system 200 that includes a nuclear imaging system including a pair of curved nuclear imaging detectors 250A, 250B. Nuclear imaging detectors 250A, 250B extend about an angle of about 45°. Each nuclear imaging detector 250A, 250B is offset at about 20° from CT source 140. Similar to multimodal imaging system 100, multimodal imaging system 200 includes a CT source 240, a CT detector 245, a support table 235 mounted on a slip ring 214 of a rotating gantry ring 210, a patient table drive unit (not shown), and a controller 260 as parts of the stationary unit.

While the embodiments shown in FIGS. 1A, 1B, and 2 are based on a pair of nuclear imaging detectors, in some embodiments, multimodal imaging systems include one or more SPECT detectors, one or more PET detectors, or one or more combined SPECT/PET detectors mounted on the rotating gantry ring.

In the embodiments shown in FIGS. 1A, 1B, and 2, the imaging components (the CT source, the CT detector, and the nuclear imaging detectors) are aligned along a circumference of a cylindrical barrel that surrounds axis of rotation Z. In such a geometrical arrangement, the CT FOV and the nuclear FOV are formed as slices that extend orthogonal to the axis of rotation Z and that overlap in their position along the axis of rotation Z. Due to the limited circumference of the barrel, the dimensions of the CT source 140, CT detector 145, and nuclear imaging detectors 150A, 150B along the circumference are restricted. Moreover, unless components can overlap, the position of the nuclear imaging detectors 150A, 150B is restricted to areas not occupied by the CT source 140 or the CT detector 145.

As shown in FIGS. 1A and 1B, the CT source 140 and CT detector 145 define a CT FOV that is orthogonal to the axis of rotation, and the nuclear imaging detectors 150A, 150B are arranged on the same circumference to provide for a common FOV. However, other relative configurations of the CT and nuclear imaging detectors are also possible. For example, as shown in FIGS. 3 to 7, one or more nuclear imaging detectors can define one or more slice-shaped FOVs that intersect the CT FOV. In such cases, CT and nuclear imaging are performed at least partly for a common FOV within the overlapping region of the FOVs. Thus, CT and nuclear imaging are performed at least partly for a common FOV and for FOV areas that are different for the CT and nuclear imaging. Allowing for intersecting FOVs instead of parallel FOVs can provide additional space for mounting the imaging components on the rotating unit.

For example, in some embodiments, CT components are positioned along a region A of axis of rotation Z, and nuclear components are positioned on one or both sides of region A as shown in FIGS. 3A to 6. In some embodiments, the nuclear imaging components may additionally extend into or through region A in azimuthal regions of the circumference where there are no CT components positioned, as shown in FIG. 7.

Figure 3A:
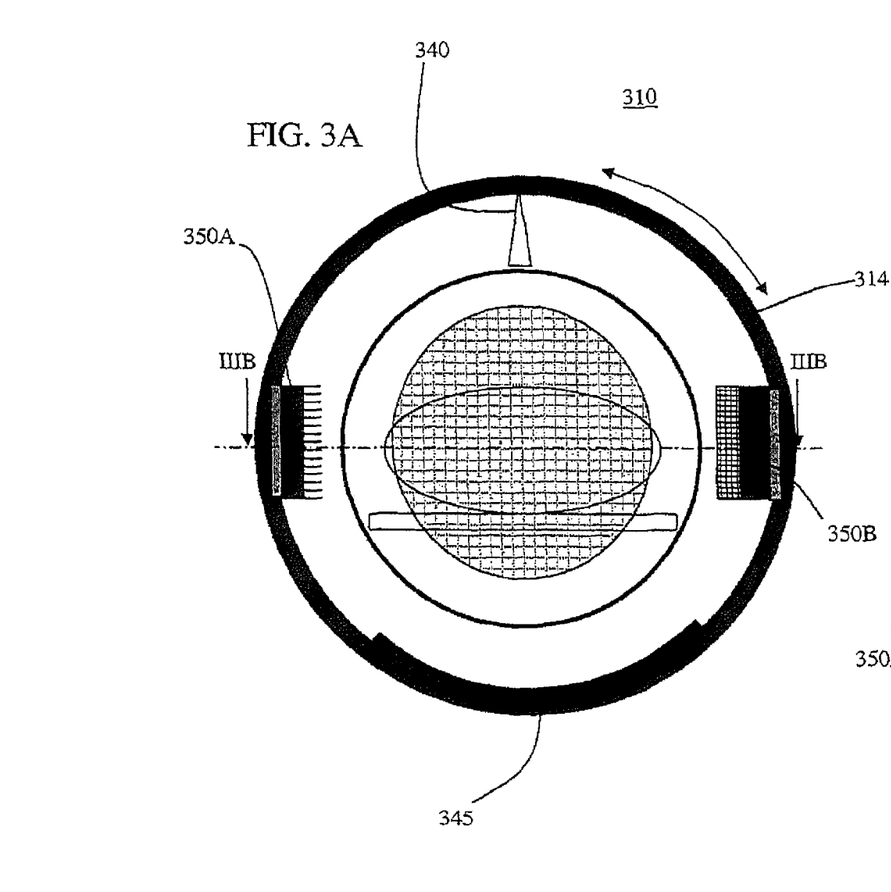
FIG. 3A is a view of an embodiment of a multimodal gantry ring along a rotation axis.
Figure 3B:
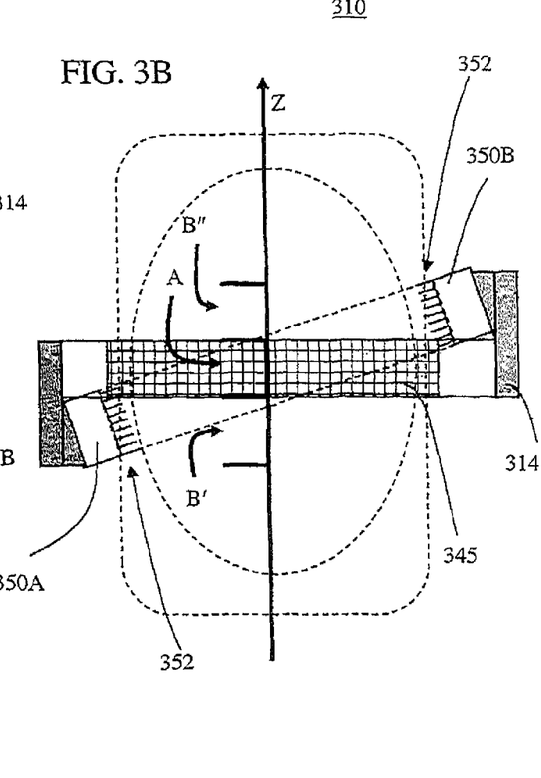
FIG. 3B is a horizontal cut view of the multimodal gantry of FIG. 3A.

As shown in FIGS. 3A and 3B, a multimodal gantry 310 includes a CT source 340 that, together with a CT detector 345, defines a CT FOV in region A. The CT FOV is oriented parallel to the plane of projection in FIG. 3A and orthogonal to the plane of projection in FIG. 3B. In the horizontal cross section shown in FIG. 3B and FIGS. 4-6, a cross-hatched box indicates areas in which nuclear imaging detectors 350A, 350B are sensitive.

Along the axis of rotation Z, nuclear imaging detector 350A is arranged before the CT FOV in region B' and nuclear imaging detector 350B is arranged behind the CT FOV in region B". Nuclear imaging detectors 350A, 350B are tilted towards the CT FOV and face each other as do the channels of collimators 352. CT detector 345 and nuclear imaging detectors 350A, 350B are sensitive to radiation transmitted through or emitted from a common FOV, respectively. Additional components of rotating gantry ring 310 include a CT source 340 and a slip ring 314.

Figure 4:
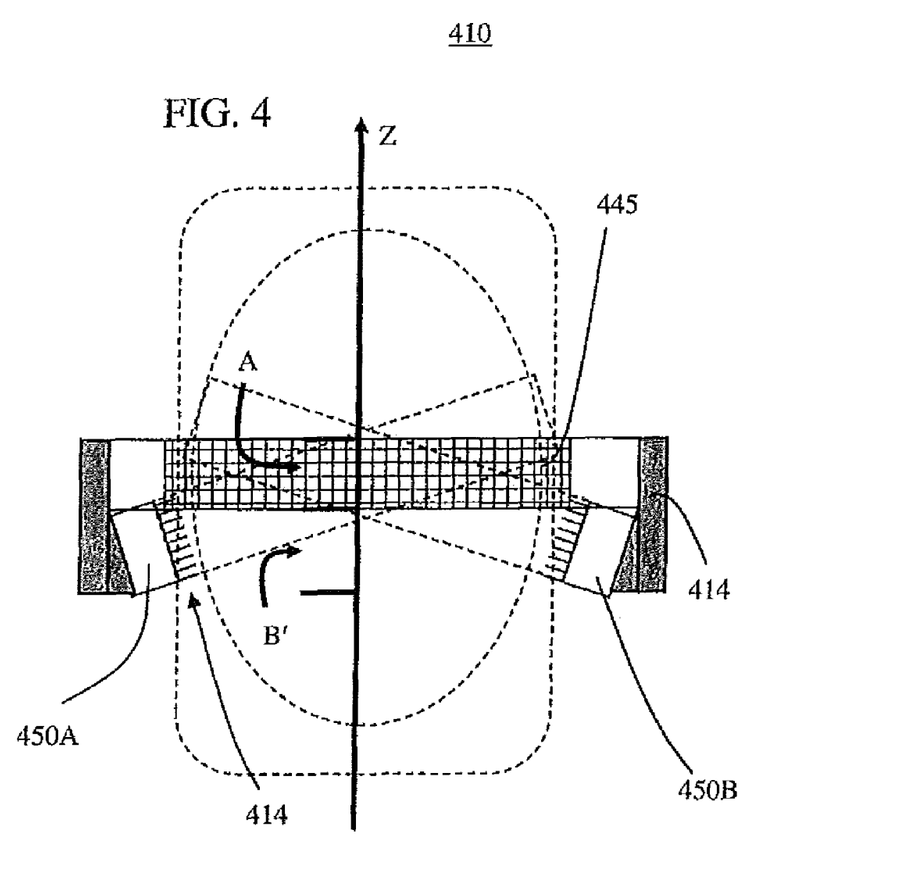
FIG. 4 is a horizontal cut view of an embodiment of a multimodal gantry ring.

While in FIGS. 3A and 3B, nuclear imaging detectors 350A, 350B are positioned on opposite sides of the CT FOV, in some embodiments the nuclear imaging detectors can be positioned on the same side of the CT FOV. As an example, a configuration of a rotating gantry ring 410 is shown in FIG. 4. Gantry ring 410 includes nuclear imaging detectors 450A, 450B which both are located within region B' of axis of rotation Z. As was the case for the embodiment shown in FIGS. 3A and 3B, nuclear imaging detectors 450A, 450B having collimators 452 tilt towards the CT FOV. As a result, detectors 450A, 450B provide a nuclear FOV that overlaps with the CT FOV. The CT FOV and the two nuclear FOVs include a common FOV for both CT imaging and nuclear imaging. Additional components mounted on the rotating gantry ring 410 include a CT source, a CT detector 445, and a slip ring 414.

While in FIGS. 3A, 3B, and 4, the detecting surface of the nuclear imaging detectors tilt with respect to the axis of rotation Z, in some embodiments, nuclear imaging detectors can include slanted collimators. Slanted collimators make the nuclear imaging detectors sensitive to radiation incident on a surface of the nuclear imaging detector under an angle defined by the inclination angle of the slanted channels of the collimator. Slanted collimators can be used, for example, with nuclear imaging detectors having a surface of detection parallel to the axis of rotation and with nuclear imaging detectors that are tilted not sufficiently to provide normal incidence for radiation emitted from the nuclear FOV.

Figure 5:
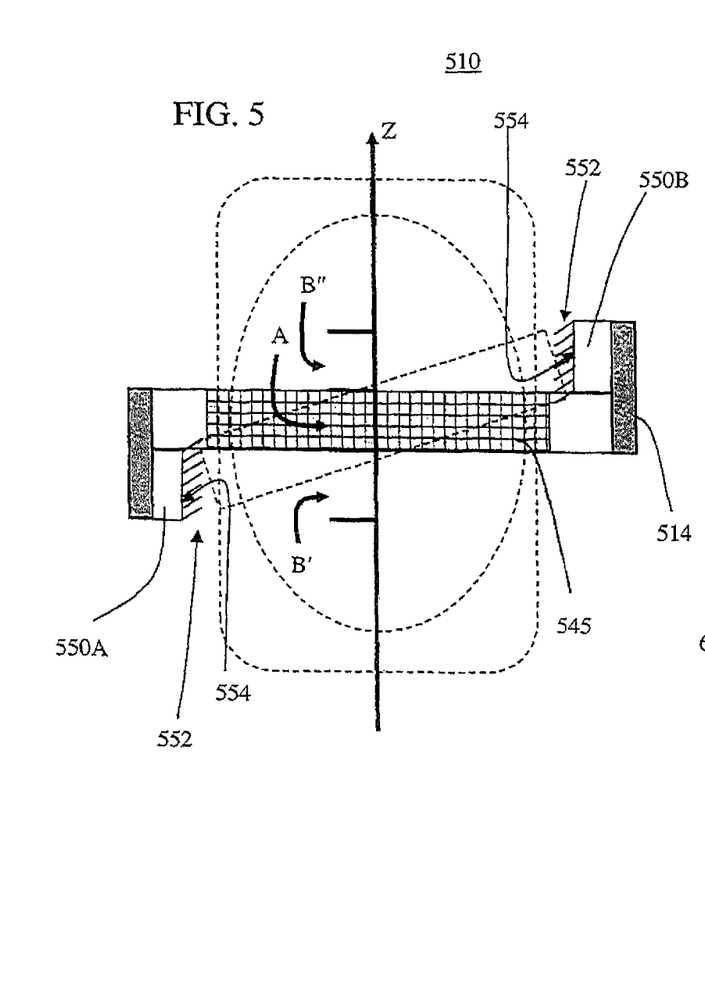
FIG. 5 is a horizontal cut view of an embodiment of a multimodal gantry ring.

As shown in FIG. 5, a configuration of a rotating gantry ring 510 similar to the configuration of FIGS. 3A and 3B uses slanted collimators 552 with nuclear imaging detectors 550A, 550B positioned in regions B' and B" respectively. Slanted collimator 552 provides channels having an orientation directed towards the CT FOV defined by CT source 540 and CT detector 545. These slanted collimators 552 enable the nuclear imaging detectors 550A, 550B to detect radiation emitted from at least parts of the CT FOV even though the surfaces 554 of the detectors 550A, 550B are parallel to the axis of rotation, Z. Additional components of rotating gantry ring 510 include a CT source, a CT detector 545, and a slip ring 514.

Figure 6:
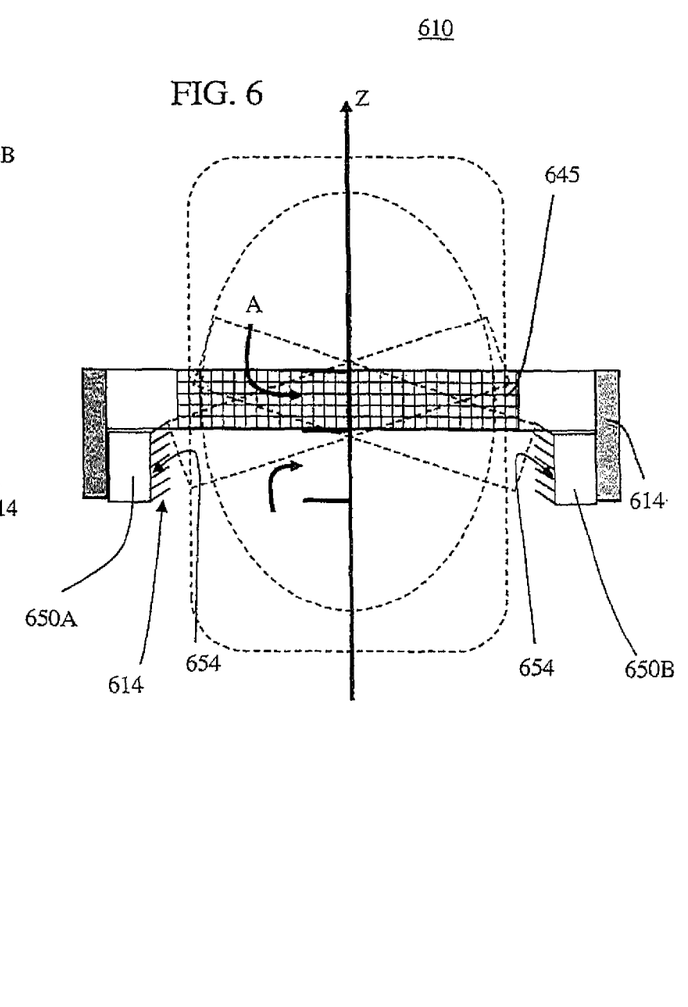
FIG. 6 is a horizontal cut view of an embodiment of a multimodal gantry ring.
Figure 7:
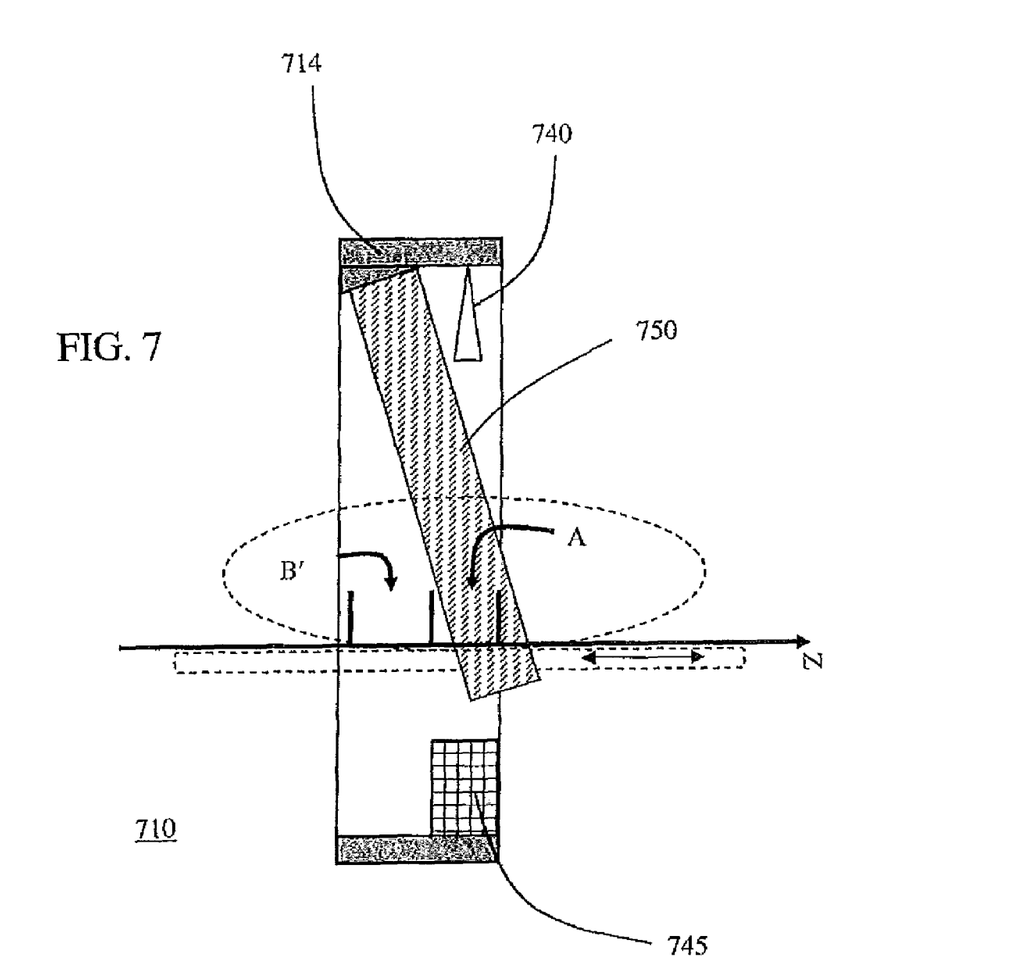
FIG. 7 is a vertical cut view of an embodiment of a multimodal gantry ring.

FIG. 6 shows a configuration similar to the configuration shown in FIG. 4. However, in FIG. 6, nuclear imaging detectors 650A and 650B and slanted collimators 614 are positioned on the same side of the CT FOV in region B'. Additional components of rotating gantry ring 610 include a CT source, a CT detector 645, and a slip ring 614.

In the embodiments shown in FIGS. 5 and 6, surfaces 654 of the nuclear imaging detectors 550A, 550B, 650A, 650B are parallel to the axis of rotation Z. This allows the nuclear imaging detectors to be mounted on the cylinder barrel of the rotating unit in a manner similar to the way the CT detectors are mounted on that barrel.

While in FIGS. 3A to 6, the nuclear imaging detectors define a slice-shaped nuclear FOV that intersects with the slice shaped CT FOV at the azimuthal range of the CT source and CT detector, other azimuthal positions for the intersection are also possible. For example, in some embodiments, the nuclear FOV intersects the CT FOV at an azimuthal range between the CT source and the CT detector. In such configurations, nuclear imaging detectors can be positioned next to the CT source and the CT detector in the direction of the axis of rotation Z and extended into the azimuthal range between the CT source and the CT detector. This allows the nuclear imaging detectors to assume closed-ring shape or a partly-closed ring shaped that are not interrupted by any CT components.

Instead of a closed ring detector, one can mount a nuclear detector system that spans a large angular segment of the circumference. For example, the nuclear detector system can span 90° or more, 120° or more, 180° or more, or 240° or more. As an example, FIG. 7 shows a vertical cut through a gantry ring with a nuclear imaging detector 750 that extends from one azimuthal region between CT detector 745 and CT source 740 to the other azimuthal region between CT source 740 and CT detector 745 on the other side of CT source 740. The center of the nuclear imaging detector 750 is arranged next to CT source 740 along the axis of rotation, Z. CT source 740 and nuclear imaging detector 750 are mounted to a common slip ring 714.

While FIGS. 3A to 7 show embodiments in which the CT FOV is a slice that lies in a plane that is orthogonal to the axis of rotation and the nuclear FOV is tilted with respect to the CT FOV, other configurations are also possible. For example, the CT FOV and the nuclear FOV can be interchanged such that the nuclear FOV lies in a plane that is orthogonal to the axis of rotation and the CT FOV is tilted with respect to the axis of rotation and with respect of the nuclear FOV. In some embodiments, the CT FOV as well as the nuclear FOV can be tilted with respect to a plane orthogonal to the axis of rotation.

Multimodal reconstruction, as described in the above mentioned U.S. patent application Ser. No. 12/369,159, by H. Vija et al. entitled "MULTIMODAL IMAGE RECONSTRUCTION" and filed Feb. 11, 2009, is described in the following in connection with FIGS. 8A to 10 as it can be applied to the multimodal imaging systems described herein. Multimodal reconstruction separates a functional activity measured with a nuclear modality into different zones where the zones are defined by a support modality. For the herein disclosed multimodal imaging systems, the nuclear imaging system corresponds to the functional modality and the CT imaging system corresponds to the support modality. In multimodal reconstruction, although the information gained from the CT image is used for defining structural zones it is not used for showing how the nuclear activity is distributed within each structural zone. For example, if a support modality can structurally define potential zones of biomarker accumulation (e.g., lesions), multimodal reconstruction can determine in which zone there is nuclear activity and how much nuclear activity is in that zone.

The multimodal imaging systems described herein are specifically adapted for multimodal reconstruction, as they provide for simultaneous or CT and nuclear imaging of a common FOV.

Figure 8A:
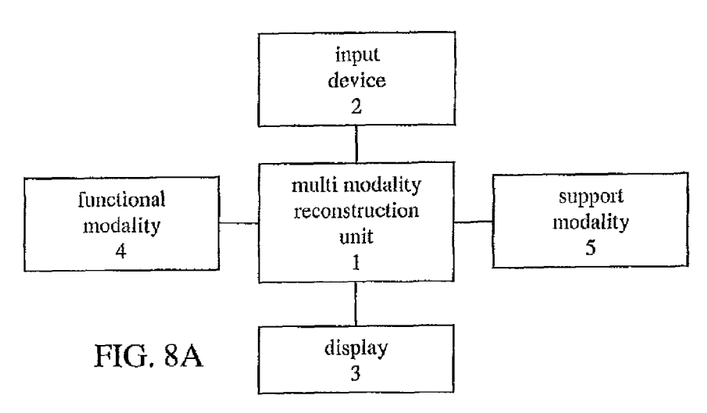
FIG. 8A is a schematic overview of an embodiment of a multimodal imaging system.

FIG. 8A shows a multimodal reconstruction unit 1 with an input device 2 and a display unit 3. The reconstruction unit 1 receives information (e.g., measured data from an examined area of a patient) from two data sources: functional modality system 4 and a support modality 5. The reconstruction unit 1 then reconstructs an image object that reproduces, for example, functional features of the examined area. Examples of a functional modality system are nuclear imaging systems, such as SPECT and PET imaging systems. Examples of support modality systems 5 include CT systems.

Figures 8B, 9A, 9B:
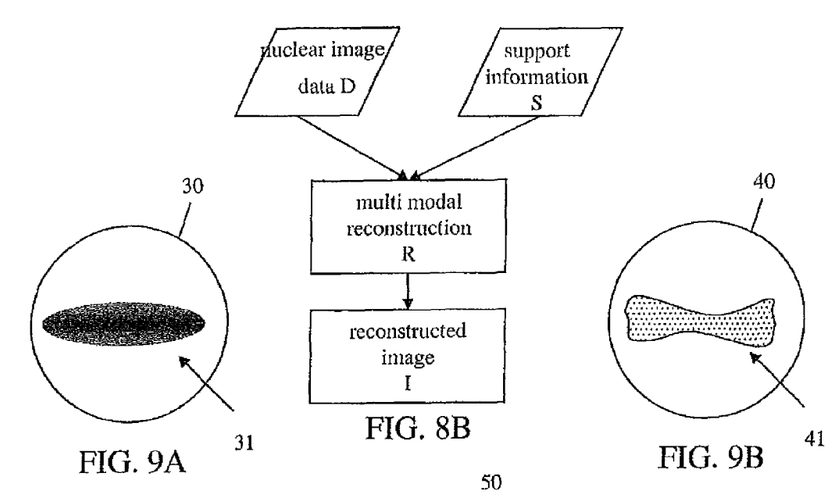
FIG. 8B is a simplified flowchart of multimodal image reconstruction.
FIG. 9A is a simplified conventional nuclear image.
FIG. 9B is a simplified CT image.

Referring to FIG. 8B, in some embodiments, the nuclear imaging system 4 measures image data D of a functional process in the patient's body by using, e.g., nuclear properties of matter. For nuclear imaging, one administers a radioactive substance, usually a disease specific biomarker, to the patient, and detects emitted radiation with a detector system, e.g., with a ring detector for PET or with one or several gamma cameras for SPECT. In general, the detector system of the nuclear imaging system 4 provides nuclear imaging data, e.g., raw data or preprocessed data, to the multimodality reconstruction unit 1.

As shown in FIG. 8B, the multimodality reconstruction unit 1 performs a multimodal reconstruction R. The multimodal reconstruction can use a system matrix H to describe the properties of the nuclear imaging system 4 to iteratively improve a data model of an image object I representing the nuclear image data D. The reconstructed image object I can then be displayed on the display 3 using well-known volume rendering techniques.

The image object I, which is defined in an object space, is a reconstruction of the nuclear image data D measured in a data space. The object space is the space in which the result of the image reconstruction is defined and which corresponds, for example, to the 3D volume (nuclear FOV) that was imaged using the nuclear imaging system 4.

Zonal information, i.e., information about zones within the examined object, can be derived from support information S. In some embodiments, the multimodal reconstruction R can improve the image quality and/or reduce the acquisition time of the nuclear imaging process by considering the zonal information in the reconstruction.

Anatomical support information can be measured with the transmission CT system 5. Besides anatomical information about the examined object (shape, volume, thickness, density of tissue types), other examples of support information include type of disease and other disease specific features (density change within tissue (e.g. bone tissue), calcification), type of application and other application specific features used to generate the image data (time dependence, easily identifiable regions of lower interest but high signal (e.g. accumulation of a biomarker in the bladder)), and biomarker specific features (pharmacokinetic features, tissue types to which biomarkers attach, time scale of processes; and the number of biomarkers). The zonal information, which can be derived by automated or manual analysis of the support information, corresponds to a separation of the object space into two or more spaces, usually including a null zone surrounding the examined object.

FIG. 9A illustrates how a nuclear image 30, e.g. of a bone, may result in a poorly resolved distribution 31 of the nuclear activity density associated with a functional process. Conversely, a CT scan, while generally insensitive to functional processes, provides considerable anatomical information. For example, in FIG. 9B, a CT scan provides an anatomical image 40 that clearly resolves the shape of a bone 41.

In conventional nuclear imaging, nuclear and anatomical images are reconstructed separately and are only presented together (e.g., as overlaid images) to the diagnosing physician. However, the resolution and image quality of the nuclear and anatomical images are determined by the respective reconstruction algorithms associated with the nuclear and anatomical imaging techniques. Sometimes, nuclear imaging techniques use an attenuation map (also referred to as μ-map) derived from a CT scan to compensate for signal loss within the examined object.

In contrast, a multimodal reconstruction R based on anatomical and nuclear imaging data uses zonal information derived from the anatomical data as support information S generated by the CT imaging system. In some cases, the μ-map is used for signal loss compensation. The support information S can provide structural information about the measured object. This structural information is used to divide the object space into multiple zones. For each such zone, one can constrain the reconstruction of the image object by using a zonal image object. Each of the zonal image objects can be treated differently during the reconstruction. However, the zonal image objects are used together to, for example, generate a data model of the reconstructed image object I. The different treatment of zones during reconstruction can arise from application of a zone-specific operation to each zone. One example of a zone-specific operation is a smoothing operation performed on individual zonal image objects.

Support information S can further relate to the energy and event time of the detected photons. Thus, a zone need not correspond to spatial coordinates, but can also be defined by energy and event time. For example, a 4D zone considers temporal changes of the position and/or shape of a zone, which can be caused by any object motion (e.g., motion caused by breathing and heart activity). Accordingly, the object space can include additional (non-geometric) dimensions when appropriate.

Figure 9C:
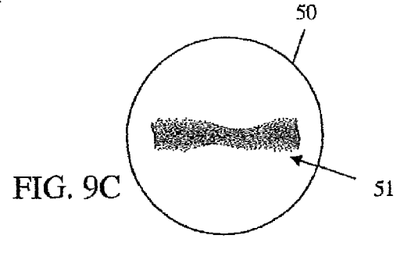
FIG. 9C is a simplified multimodal reconstructed nuclear image.

Referring to FIG. 9C, a multimodal reconstructed image 50 can show functional activity 51 with increased anatomical accuracy. Thus, multimodal reconstruction can use the anatomy of the examined object when reconstructing the nuclear image object. In some embodiments, multimodal reconstruction uses the distribution of a target tissue of a biomarker (e.g., a specific organ or a bone) when reconstructing the density of that biomarker as it primarily accumulates within that target tissue.

In multimodal reconstruction, the resolution of the support information can affect the resolution of the nuclear image object and the sensitivity of the nuclear process. Within a zone, the nuclear resolution and sensitivity may prevail. For example, along the extension of the bone shown in FIG. 9C, the resolution is governed by the nuclear imaging system, e.g., by SPECT and PET. However, across ozone, e.g., at the interface of the bone with surrounding tissue, the resolution may be improved to that of the CT imaging system, e.g., to the high resolution of a CT system.

In addition to the automated segmentation into different zones, one can manually assign zones to specifically known areas of interest (e.g., specific zoning of lymph nodes) or to exclude signal from a selected area (e.g., the bladder). In the case of the bladder, one can manually assign a bladder zone in the sagittal view to exclude large amounts of signal associated with the accumulation of a radioactive substance accumulates in the bladder.

To summarize, by identifying features of the examined object, one can generate zonal information to separate the object space into zones. The zonal information can, in general, be derived from supplementally performed medical imaging. In addition, information from the nuclear imaging process itself can be used when separating the object space into zones. For example, one can introduce the additional condition that an intensity value of a preliminary reconstructed nuclear image be fulfilled at an object point or over a group of object points to distinguish tissue having similar absorption coefficients but different affinities to a radioactive substance.

The zonal information can be provided as a zone-function. The zone-function can be a purely functional presentation, indicating position(s) and shape(s) in object space. Another presentation of a zone-function can be an object, defined in the dimensions of the object space that as an entry for an object point includes the degree of affiliation of that object point to the respective zone. The definition of zone-functions as an object in object space allows projecting the zone (here the zone-function) onto any object by matrix multiplication.

Based on the zonal-information, one can prepare zonal image objects. Only the object points within the zone corresponding to the zonal image object contribute to the reconstruction of the image object. During the reconstruction, the values of object points outside the zone do not contribute to the reconstruction of the zonal image object. Such values are constrained to be zero because one assumes that those object points do not generate any detected signal.

As an example of restricting the contribution of the zonal image object to its zone, one can define a zone-function that assigns values greater than zero to all object points at least partly affiliated with the respective zone. For example, in an object representing the zone-function, one can assign the value 1 to object points having a $\mu$-value within a predefined range of $\mu$-values and a value of 0 to object points outside that range. To allow a smooth transition between zones, the zone-function can have values between 0 and 1 for border object points. For example, one can assign a ramp of width $\delta\mu$ at a limiting $\mu$-value in which the zone-function reduces from the value of 1 to the value 0.

Multiplication of any object in object space with a zone-function restricts the entries of the object to be non-zero only at object points that are affiliated with the respective zone. In case object points outside the zone are assigned non-zero values during reconstruction, a repeated multiplication with the zone-function may become necessary to set those values to 0.

The separation of the object space into multiple zones can be appropriate if, for example, a radioactive substance is known to accumulate in different tissue types with a different density, or when different biomarkers attach to different organs. In such cases, one can separate the object space on the basis of the various tissue types.

The generation of zonal information from the CT images is performed by first identifying features of the examined object that relate to the nuclear measurement and then identifying the object points having the respective feature. In general, the areas defined by the zones abut each other. However, as discussed earlier, one can allow smooth transitions between zones.

A special registration between the support information (CT imaging) and the object space of the nuclear measurement is required to accurately assign the object points in the object space of the nuclear imaging device 3 to their respective zone(s). For the multimodal imaging systems described herein, the registration can be based on a geometrical relation between the CT FOV and the nuclear FOV as determined from the designed relative arrangement of the CT imaging system and the nuclear imaging device 3a. In addition or alternatively, the registration can be based on a predetermined geometrical relation between the CT FOV and the nuclear FOV. Moreover, one can perform a calibration-reconstruction of a calibration measurement.

In general, the reconstruction is performed using the signal associated with a zone as an additional parameter. e.g., an additional constraint, while the spatio-temporal structure of the zones is preserved. Methods to provide zone-specific constraints include performing specific measurements, estimating the constraints based on imaging data, or providing predetermined constraints in a medical database, which contains information about the constraint, e.g., for various diseases, radioactive materials, biomarkers, and patient parameters such as age, sex, height, and weight. In nuclear imaging, predetermined uptake expected for a zone (herein also referred to as fractions) can also be used as a constraint for the zones.

To measure the zone-specific constraints, one can perform an unconstrained pre-reconstruction of the image data and determine, thereby, e.g., the fractions directly from the uptakes measured in a zone. Determining the fractions from the image data is less susceptible to deviants than reading values from a database that may not always be appropriate for the current nuclear measurement. However, the values for the fractions of the uptake depend on the quality of the pre-reconstruction, and an error in the constraints may propagate into the multimodal reconstruction.

Another method of determining constraints includes assigning to each zone a constant $c_n$ for all object points in that zone, and performing an optimization process based on a merit function (such as Poisson maximum-likelihood, Mighell's modified chi-square gamma) that optimizes the coefficients $c$, that represent the constraint (e.g., the relative uptake). This optimization is referred to herein as renormalization and is described below in detail.

The zonal reconstruction allows one to transfer the benefits of high-resolution of structural imaging technique to nuclear imaging techniques, thereby increasing, for example, the resolution of the nuclear images. In addition, or alternatively, one may be able to perform nuclear imaging with lower signal levels. For nuclear imaging, this can allow imaging with lower count rates, lower counts, shorter imaging times. As a result, a patient will need a lower radiation dose.

Figure 10:
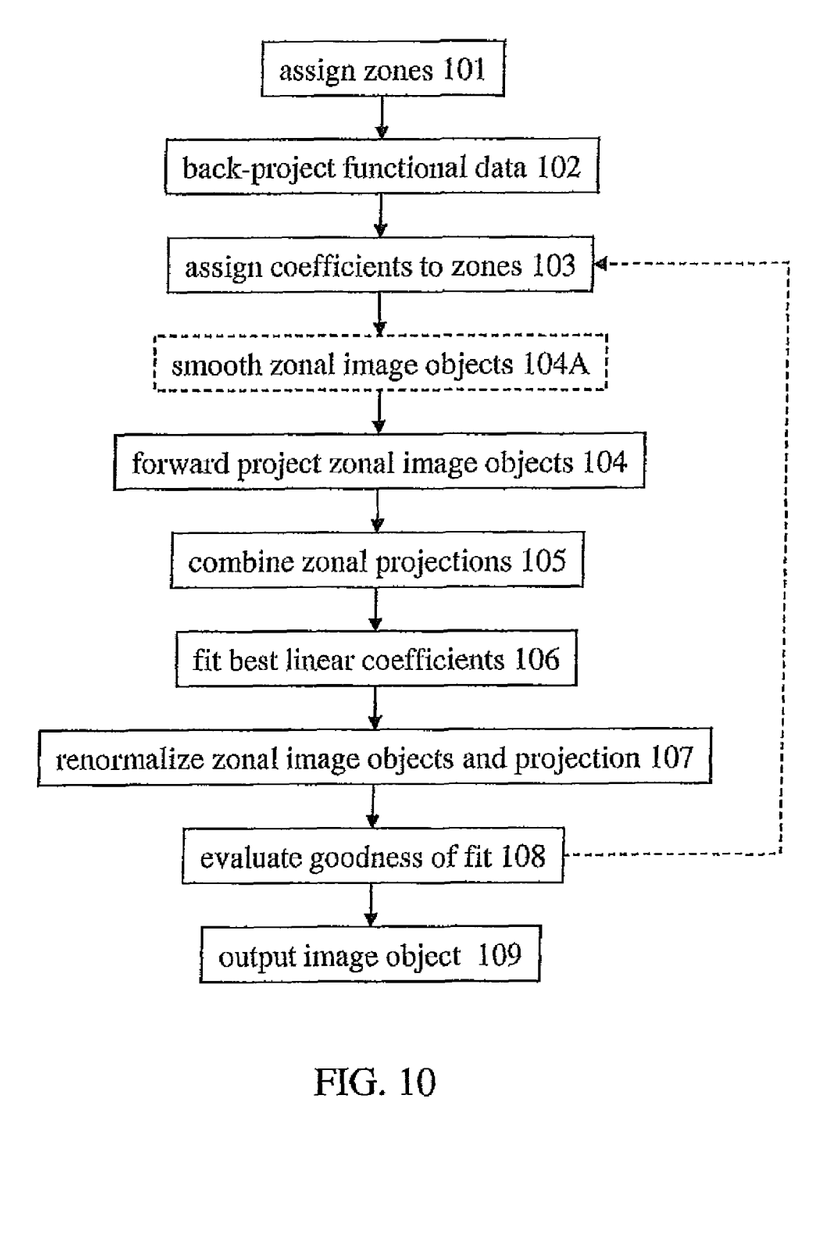
FIG. 10 is a flowchart illustrating multimodal reconstruction with and without zonal smoothing.

FIG. 10 shows a flowchart of a multimodal algorithm. A multimodal reconstruction can include the steps of assigning the zones to the object space (step 101), reading nuclear image data, back-projecting the nuclear image data (step 102), thereby generating zonal image objects, assigning linear coefficients (zonal emission fractions) to the zones (step 103), forward projecting each zone separately and generating zonal projections, i.e., zonal data models. (step 104), calculating a total projection, i.e., a complete data model, as a linear combination of the zonal projections (step 105), performing a fit to derive the best linear coefficients (step 106), renormalizing the zonal image objects and the zonal projection by the new linear coefficient (step 107), and checking for goodness-of-fit of the reconstruction (step 108). If necessary, one returns to step 103 i.e., the steps 103-108 are repeated until a sufficient goodness-of-fit is achieved or until a maximum number of iterations is reached. At the end, the reconstructed image is output (step 109).

In the flowchart of FIG. 10, not every step needs to be performed. Furthermore, the order of steps may vary. For example, the zones are usually only assigned (step 101) once, at the beginning of the multimodal reconstruction, and the coefficients may be assigned immediately after assigning the zones.

Introducing zones enables execution of an optional smoothing of a zonal image object (step 104A). As an example, pixon smoothing can be applied in a zone-specific way. For pixon smoothing, the flowchart of FIG. 10 can include the additional step of generating (and eventually updating) zonal pixon maps that provide zone-specific pixon kernel functions to the pixon smoothing operation.

Examples of algorithms for multimodal reconstruction are disclosed in the above-mentioned U.S. patent application Ser. No. 12/369,159, by H. Vija et al. entitled "MULTIMODAL IMAGE RECONSTRUCTION" and filed Feb. 11, 2009.

For nuclear image reconstruction, pixon smoothing and the generation of a pixon map P are described in more detail, for example, in U.S. patent application Ser. No. 11/931,084, filed Oct. 31, 2007 and entitled "EXTERNAL PIXON FOR TOMOGRAPHIC IMAGE RECONSTRUCTION TECHNICAL FIELD," U.S. patent application Ser. No. 11/931,195, filed Oct. 31, 2007 and entitled "RECONSTRUCTING A TOMOGRAPHIC IMAGE," and U.S. patent application Ser. No. 11/931,030, filed Oct. 31, 2007 and entitled "DETERMINING A PIXON MAP FOR IMAGE RECONSTRUCTION," and in the co-pending U.S. patent application Ser. No. 12/369,176, by H. Vija et al. entitled "DETERMINING A MULTIMODAL PIXON MAP FOR TOMOGRAPHIC-IMAGE RECONSTRUCTION" and filed Feb. 11, 2009. The contents of all the preceding patent applications are incorporated herein by reference.

A number of embodiments of the invention have been described. Nevertheless, it will be understood that various modifications may be made without departing from the spirit and scope of the invention. For example, in some embodiments, CT imaging can be performed in a strobe-mode to avoid having the nuclear imaging detectors be contaminated by scattering radiation, thereby performing quasi-simultaneous nuclear and CT imaging.

Moreover, in some embodiments, multimodal reconstruction can be applied to a wide variety of reconstruction processes, including but not limited to maximum likelihood, non-negative least squares, maximum a posteriori, and Bayesian reconstruction algorithms.

It is to be further understood that, because some of the constituent system components and method steps depicted in the accompanying figures can be implemented in software, the actual connections between the systems components (or the process steps) may differ depending upon the manner in which the disclosed method is programmed. Given the teachings provided herein, one of ordinary skill in the related art will be able to contemplate these and similar implementations or configurations of the disclosed system and method.

For example, the numerical and symbolic steps described herein can be converted into a digital program executed, e.g., on a digital signal processor according to methods well known in the art. The digital program can be stored on a computer readable medium such as a hard disk and can be executable by a computer processor. Alternatively, the appropriate steps can be converted into a digital program that is hardwired into dedicated electronic circuits that executes the steps. Methods for generating such dedicated electronic circuits based on a given numerical or symbolic analysis procedure are also well known in the art.

As used herein, the use of the pronoun "one" as a subject is not intended to imply that a human being must always be the agent of the action.

Accordingly, other embodiments are within the scope of the following claims.

What is claimed is:

1. A multimodality imaging system comprising:
    a gantry with a stationary unit and a rotating it rotatable around a rotation axis and providing an opening extending along the rotation axis through which a subject is insertable,
    a support table coupled to the stationary unit for supporting a subject,
    a table drive unit coupled to the support table for translating the support table in a direction extending along the rotation axis,
    a CT source coupled to the rotating unit, the CT source being configured to emit a fan beam through the opening,
    a CT detector coupled to the rotating unit opposite the CT source, the CT detector being configured to detect the fan beam, and
    a nuclear imaging detector coupled to the rotating unit, the nuclear imaging detector being configured to detect nuclear radiation emitted from within the opening in a direction differing from a propagation direction of the fan beam; and
    a control unit configured to, during operation of the multimodality imaging system, cause the rotating unit to rotate with a revolution time of one second or less, and to control the translation of the support table such that the CT detector performs diagnostic quality CT imaging of the subject and the nuclear imaging detector performs a spiral scan of the subject, whereby the multimodality imaging system acquires spatio-temporally consistent transmission CT data and emission nuclear imaging data
    wherein zonal information defines a separation of the nuclear field-of-view into at least two zones and is derived from the transmission CT data.

2. The system of claim 1, wherein the control unit is configured to control the CT detector and the nuclear imaging detector to acquire simultaneously the transmission CT data and the emission nuclear data, respectively.

3. The system of claim 1, wherein a nuclear field-of-view defined by the nuclear imaging detector and a CT field-of-view defined by the CT detector overlap.

4. The system of claim 1, further comprising a common slip ring coupled to the rotating unit, and wherein the nuclear imaging detector, the CT detector, and the CT source are mounted to the common slip ring.

5. The system of claim 1, wherein the nuclear imaging detector includes two detector units arranged at opposite sides of the fan beam.

6. The system of claim 1, wherein the nuclear imaging detector includes at least one single photon computed tomography detector unit.

7. The system of claim 1, wherein the nuclear imaging detector includes at least one positron emission tomography detector unit.

8. The system of claim 1, wherein the nuclear imaging detector includes at least one combined single photon computed tomography and positron emission tomography detector unit.

9. The system of claim 1, wherein the nuclear imaging detector includes a ring detector system.

10. The system of claim 1, wherein the CT source is configured for pulsed CT emission.

11. The system of claim 1, wherein a radiation sensitive surface of the nuclear imaging detector is arranged at a radial distance from the rotation axis that is the same or less than the radial distance from the rotation axis to a radiation sensitive surface of the CT detector.

12. The system of claim 1, wherein the nuclear imaging detector includes a collimator having a rigidity sufficient to withstand force generated by a rotation of the nuclear imaging detector with a revolution time of one second.

13. The system of claim 12, wherein the nuclear imaging detector includes a tungsten collimator.

14. The system of claim 12, wherein the nuclear imaging detector includes a collimator configured for at least one of active collimation, passive collimation, parallel collimation, focusing collimation, multi-focusing collimation, and coded-aperture collimation.

15. The system of claim 1, further comprising an image processing unit configured for multimodal reconstruction for reconstructing the emission nuclear imaging data based on zonal information derived from the transmission CT data.

16. A method of multimodal imaging of an object, the method comprising:

performing spatio-temporal detection of transmission CT data of a fan X-ray beam;

performing, simultaneously with the spatio-temporal detection of transmission CT data, spatio-temporal detection of emission nuclear imaging data emitted from the object with a propagation direction across the propagation direction of the fan X-ray beam;

identifying at least two zones in the object based on the transmission CT data;

reconstructing an image object from the emission nuclear imaging data under the constraint that respective portions of detected nuclear events are associated with selected zones: and outputting data representative of the image object.

17. A multimodality imaging system comprising:

a gantry with a stationary unit and a rotating unit rotatable around a rotation axis, the gantry having a wall forming an opening extending along the rotation axis, wherein a CT source coupled to the rotating unit, the CT source being configured to emit a fan beam through the opening, a CT detector coupled to the rotating unit, the CT detector being mounted opposite the CT source and configured to detect the fan beam, the CT source and the CT detector defining a CT field-of-view, and a nuclear imaging detector coupled to the rotating unit, the nuclear imaging detector being configured to detect nuclear radiation emitted from within the opening in a direction differing from a propagation direction of the fan beam, the nuclear imaging detector defining a nuclear field-of-view, wherein at least one of the CT field-of-view and nuclear field-of-view are tilted with respect to a plane orthogonal to the axis of rotation.

18. The system of claim 17, wherein the CT field-of-view extends between the CT source and the CT detector and is shaped as a slice having a thickness defined by a thickness of the CT detector.

19. The system of claim 17, wherein the nuclear field-of-view extends from the nuclear imaging detector along a direction defined by a collimator of the nuclear imaging detector.

20. The system of claim 17, wherein the rotating unit comprises a common slip ring, and wherein the nuclear imaging detector, the CT detector, and the CT source are mounted to the common slip ring.

* * * * *